United States Patent [19]

Stikeleather et al.

[11] 4,323,126
[45] Apr. 6, 1982

[54] RIDGE MULCH TILLAGE METHOD AND APPARATUS

[75] Inventors: Larry F. Stikeleather, New Berlin; David S. Totten, Greendale, both of Wis.

[73] Assignee: Allis-Chalmers Corporation, Milwaukee, Wis.

[21] Appl. No.: 108,838

[22] Filed: Dec. 31, 1979

[51] Int. Cl.³ ............................................. A01B 13/14
[52] U.S. Cl. .................................... 172/147; 172/149; 172/175; 172/199
[58] Field of Search ......................... 172/140, 147–149, 172/150, 152, 155, 166, 173, 175, 177, 179, 182, 187, 193, 199, 200, 201, 314, 391, 413, 418, 440, 441, 451, 519, 552, 583, 587, 594, 595, 596, 599, 618, 640, 657, 693, 695, 696, 661, 662, 687–689, 747, 713, 762, 763

[56] References Cited

U.S. PATENT DOCUMENTS

| Re. 3,750 | 11/1869 | Hall | 172/166 |
| 12,571 | 3/1855 | Yost | 172/201 |
| 537,707 | 4/1895 | Dale | 172/166 |
| 1,220,449 | 3/1917 | Patterson | 172/166 |
| 3,965,989 | 6/1976 | Ward | 172/314 |
| 4,173,261 | 11/1979 | Wells | 172/202 |

FOREIGN PATENT DOCUMENTS 1949057  4/1971  Fed. Rep. of Germany ...... 172/152

Primary Examiner—Richard J. Apley
Assistant Examiner—Carl Moy
Attorney, Agent, or Firm—Lee H. Kaiser

[57] ABSTRACT

A method for preparing a field which has crop residue rows for subsequent row crop planting comprises cutting a plurality of furrows between crop residue rows and lifting and turning over the soil from the furrows into ridges, and simultaneously scraping over a plurality of crop residue rows and transferring the residue into the furrows which are being simultaneously cut, and wherein the former step forms the ridges on surfaces that are simultaneously being cleared by the latter step. The method is accomplished by tillage apparatus including a horizontal frame, a plurality of furrow cutting moldboards affixed to the frame and being curved to lift and turn over the soil cut from the furrows into ridges, and a plurality of trash boards affixed to the frame diagonally to the crop rows and in alternate relation to the moldboards and being curved to transfer the crop residue removed thereby into the furrows being simultaneously cut by the moldboards.

13 Claims, 6 Drawing Figures

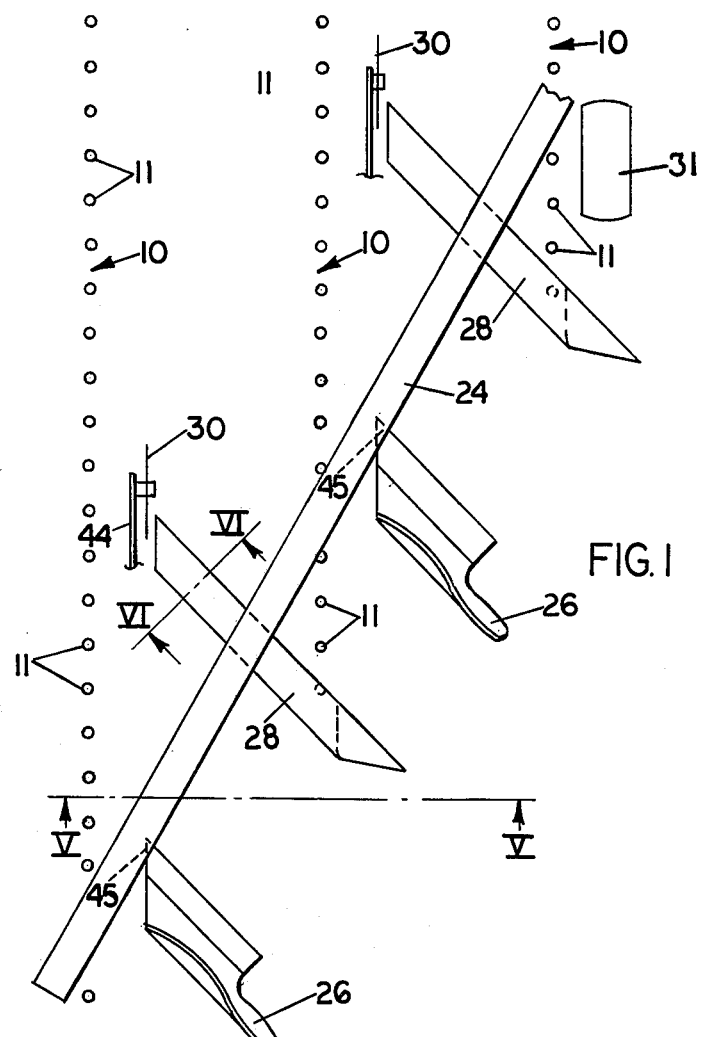
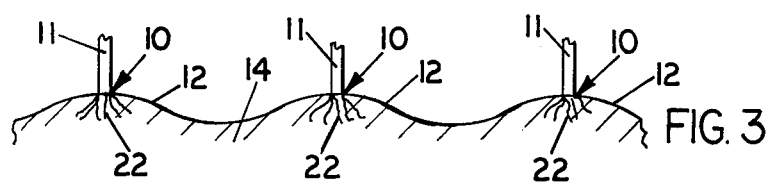
FIG. 3
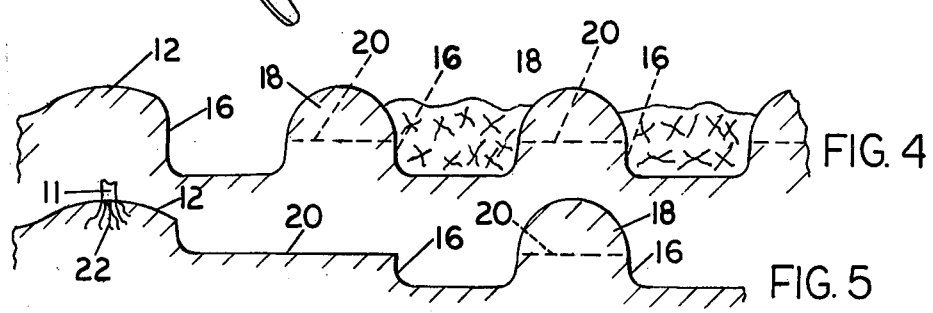
FIG. 4
FIG. 5

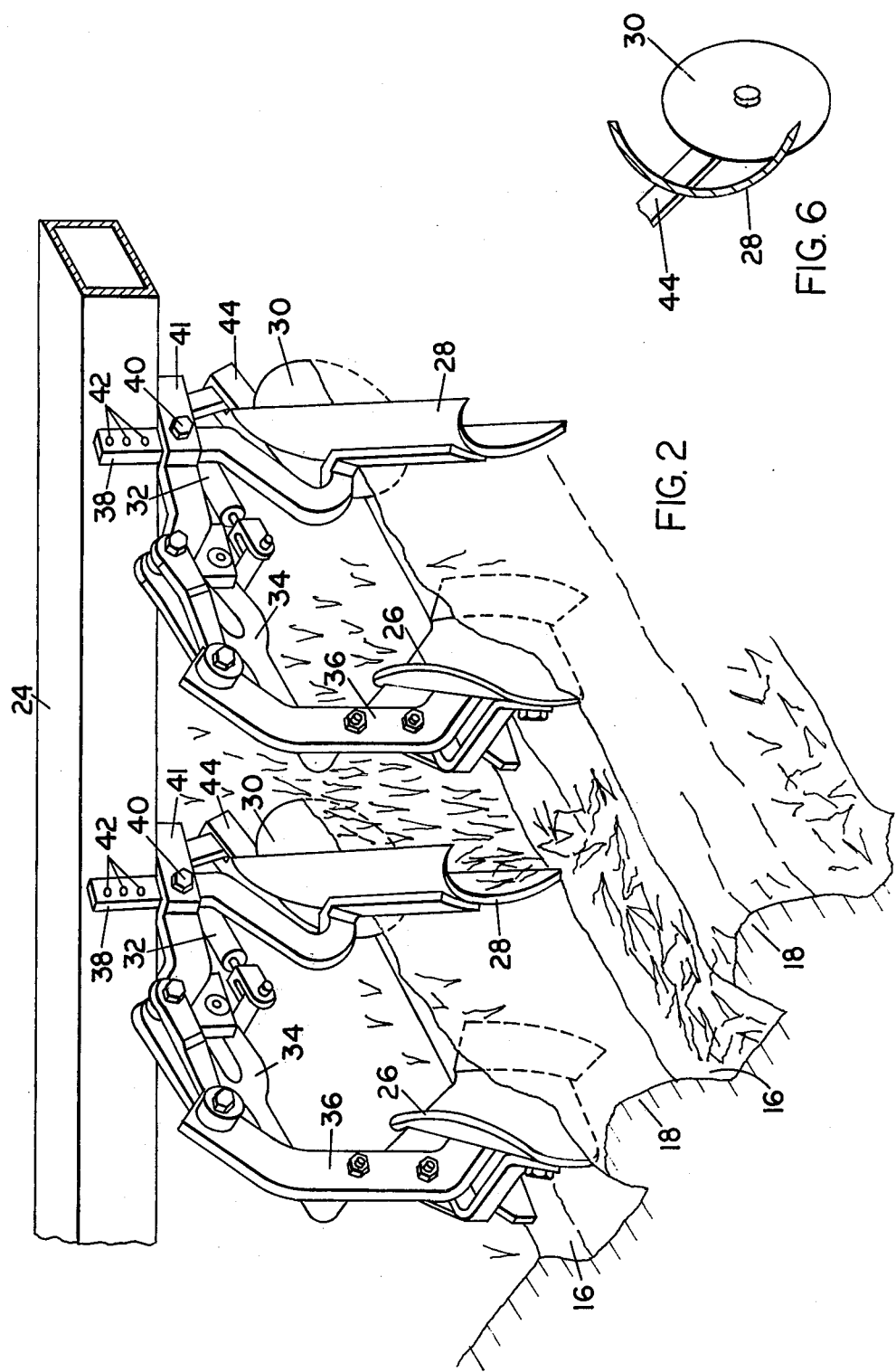

RIDGE MULCH TILLAGE METHOD AND APPARATUS

This invention relates to a method and apparatus for farming and in particular to a method and apparatus for preparing a field having rows of crop residue, such as corn stalks, for subsequent row crop planting.

BACKGROUND OF THE INVENTION

Crop residue is conventionally plowed under in the spring or fall using a moldboard. It is known from U.S. Pat. No. 3,913,502 to prepare a poorly drained field of heavy yet erodible soil such as clay loam on which a previous crop such as corn has been grown in ridges by the method of removing the crop residue from the ground, shredding the stalks by means such as a flail type shredder, forming ridges in the ground using hilling discs, and redepositing the shredded stalks and trash in the valley between the ridges for the purpose of water conservation and to improve warming of the soil in the spring. Such method requires use of a relatively expensive shredder and considerable energy to operate the shredder, and the shredder and hilling discs can only process a few crop rows during each pass across the field.

A plow having a scraper attachment is also known from U.S. Pat. No. 308,920, but the crop residue from use of such scraper attachment is buried when the plow bottom turns over the adjacent crop row.

OBJECTS OF THE INVENTION

It is an object of the invention to provide an improved method and apparatus for preparing a field having crop residue rows for subsequent row crop planting which eliminates the above disadvantages of the method disclosed in U.S. Pat. No. 3,913,502 and does not require the use of an expensive shredder.

It is a further object of the invention to provide an improved method and apparatus for preparing a field having rows of crop residue which, in a single pass across the field, simultaneously cuts furrows between adjacent row, clears the rows of stalks and trash and transfers the crop residue into the furrows to provide mulching, and lifts and turns over the soil cut from the furrows into residue-free ridges on the cleared surfaces. A still further object is to provide such improved method and apparatus which facilitates drying out of the ridges in the spring by transferring the stalks and trash to the furrows and causes the ridges to warm more quickly in the spring than the adjacent furrows, thereby permitting earlier planting and providing increased crop yields. Another object of the invention is to provide such improved method and apparatus which allows fall tillage of the soil without erosion of the field during the winter and requires no preparation of the field in the spring so only a single pass is required to plant the new crop in the ridges, thereby permitting earlier planting and contributing to a higher yield per acre. Still another object is to provide such improved method and apparatus which utilizes the prior years crop residue for moisture conservation purposes by transferring the stalks to the furrows as mulch material to retard evaporation of water from the furrows and facilitate retention of moisture. A still further object is to provide such improved tillage method and apparatus which reduces the amount of water required to grow a crop by directing rain or irrigation water into furrows between ridges so additional water is transferred to subsurface soil and plowing and stalk residue in the furrows as mulching. Still another object is to provide such improved tillage method and apparatus which removes the plant roots and provides more stable tracking than the method of U.S. Pat. No. 3,913,502.

SUMMARY OF THE INVENTION

A method in accordance with the invention for preparing a field which has crop residue rows for subsequent row crop planting comprises simultaneously cutting a plurality of furrows between crop residue rows and lifting and turning over the soil from the furrows into ridges; simultaneously with the furrow cutting step scraping over a plurality of crop rubble rows and transferring the crop residue into the furrows which are being simultaneously formed by the furrow cutting step; the furrow cutting and soil lifting and turning step forming the ridges on the surfaces which are simultaneously being cleared by the scraping over step.

Apparatus in accordance with the invention for preparing a field having rows of crop residue for subsequent crop row planting comprises a horizontal frame, such as a plow frame; a plurality of furrow cutting and ridge forming moldboards affixed to the frame on centers equal to the row spacing and being curved to lift and turn over the soil cut from the furrows into ridges on surfaces being simultaneously cleared by a plurality of elongated trash boards affixed to the frame diagonally to the rows and in alternate relation to the moldboards and on centers equal to the row spacing and being curved to transfer the residue into the furrows being simultaneously cut by the moldboards. Coulter discs may be disposed at the leading edge of the trash boards and in alignment with the furrow forming edge of the succeeding moldboard to slice the soil and cut bent over corn stalks.

DESCRIPTION OF THE DRAWINGS

The above and other objects and advantages of the invention will be more readily apparent from consideration of the following drawings wherein:

FIG. 1 is a schematic plan view of two-row tillage apparatus embodying the invention;

FIG. 2 is a perspective view of the two-row tillage apparatus shown in FIG. 1;

FIG. 3 is a schematic surface profile of a ridged field having rows of crop residue such as corn stalks;

FIG. 4 is a schematic surface profile of a field which has been tilled by the apparatus of FIGS. 1 and 2;

FIG. 5 is a schematic surface profile of a field taken along line V—V of FIG. 1; and FIG. 6 is a view taken along VI—VI of FIG. 1.

DETAILED DESCRIPTION

Referring to the drawings, FIG. 3 schematically shows a surface profile of a ridged field in which rows 10 of crop residue such as corn stalks 11 stand on ridges 12 which had been formed in heavy but erodible soil 14 such as clay loam. Conventionally such corn stalks 11 are plowed under in the fall or spring using a moldboard. In accordance with the invention the field may advantageously be tilled in the fall by simultaneously cutting a plurality of furrows 16 between crop residue rows 10 and lifting and turning over the soil from the furrows into residue-free new ridges 18 on a plurality of cleared surfaces 20 which are scraped over simultaneously with the furrow cutting operation to remove the corn stalks and plant roots 22 and transfer such crop residue as mulch into the furrows 16 which are simultaneously being cut. It will be appreciated that such tillage method facilitates drying out of the residue-free new ridges 18 in the spring by transferring the stalks and residue to the furrows 16 as mulch material to retard evaporation of water and causes the new ridges 18 to warm more quickly in the spring than the adjacent furrows 16, thereby permitting earlier planting and providing increased crop yield. It will also be appreciated that such method allows fall tillage of the soil without substantial erosion during the fallow season, requires little or no preparation of the field in the spring so only a single pass is required to plant the new crop in the new ridges 18, and directs rain into the furrows 16 so that additional amounts of moisture are transferred to subsurface soil, thereby increasing yields when rainfall amounts are less than optimum.

As shown in FIGS. 1 and 2, two-row tillage apparatus embodying the invention for preparing a field having crop rows 10 with residue for subsequent crop row planting includes an elongated horizontal plow supporting frame, or bottom base 24 disposed diagonally to the crop rows 10 and which preferably comprises a structural steel tubular member; a plurality of furrow cutting and ridge forming ridge boards, or moldboards 26 affixed to frame 24 so as to be separated a distance equal to the spacing between adjacent crop rows, e.g., 32 inches, and which cut the furrows 16 between the adjacent crop rows 10; a plurality of elongated trash boards 30 28 affixed to plow frame 24 in alternate relation to the moldboards 26 on centers equal to the spacing between crop rows 10 and being disposed diagonally to the crop rows 10 and preferably having lower scraping edges, or cutting edges 29 to remove the crop residue stalks 11 and plant roots 22 and being curved to roll over and transport such crop residue into the furrow 16 cut by the moldboard preceeding them. Coulter disc, or bladed rollers 30 may be affixed to frame 24 adjacent the leading edge of each trash board 28 to slice the soil and cut bent over stalks and thus reduce the size of the residue. The leading end of plow frame 24 may be attached to a tractor (not shown) in known manner and the trailing end of the frame 24 may be supported in known manner on a steerable tail wheel so that depth of furrow cutting and scraping can be controlled in known manner, for example, by the tractor lift arms (not shown) to raise the leading end of frame 24 and by a remote ram (not shown) which acts on the tail wheel to selectively raise or lower the rear end of plow frame 24. FIG. 1 schematically represents that the tractor right rear tire 31 may be adjacent the right crop row 10 being cleared and that the trailing edge of the leading trash board 28 is generally in alignment with the inner edge of tire 31.

Moldboards 26 operate in residue-free soil between old ridges 12, and consequently complete inversion of the soil is not required. Moldboards 26 are curved to lift and turn over the soil from furrows 16 and pile it on top of the surfaces 20 cleared by the preceding trash boards 28 to preferably form new ridges 18 free of crop residue having a soil depth of approximately six to eight inches above the undisturbed soil. Moldboards 26 may be supported on plow frame 24 by a self-restoring, or automatic reset plow trip mechanism such as disclosed in U.S. Pat. No. 3,599,728 to R. G. Moe having the same assignee as this invention which permits the moldboards 26 to raise up and pivot upon striking an object and then return to operative position after the object has been cleared. Only a portion of the moldboard supporting means is disclosed in FIG. 2 perspective view which represents biasing means 32 such as a hydraulic cylinder which exerts a force on a link 34 affixed to a stub beam 36 that carries moldboard 26 to normally retain moldboard 26 in operative plowing position.

Trash boards 28 are preferably arcuate in cross section and disposed diagonally, e.g., at approximately 40 degrees, to the crop rows 10 so that the crop residue stalks 11, plant roots, and trash are rolled and transported laterally to fill the furrow 16 left by the moldboards 26 preceding them.

The disclosed apparatus may be operated in a manner similar to a moldboard plow. Trash boards 28 may be welded to generally vertically extending support members 38 affixed by bolts 40 to a horizontal portion 41 of the moldboard supporting means such as disclosed in U.S. Pat. No. 3,599,728. FIG. 2 schematically illustrates that support members 38 have a plurality of bolt-receiving holes 42 so that trash boards 28 may, if desired, be raised to inoperative position if the apparatus is to be used to establish ridges in heavy residue in previously unridged ground. Raising the trash boards 28 to inoperative position may be necessary in such unridged ground in that removal of root knots may require deeper operation of trash boards 28 than is feasible. In subsequent years, after ridging has been established, the trash boards 28 serve their intended function of clearing the stalks and plant roots from the old ridges 12.

Coulter discs 30 may be of the spring loaded type disclosed in U.S. Pat. No. 3,529,676 to R. G. Moe et al, having the same assignee as this invention, and may be pivotally carried on the end of an arm 44 supported from plow frame 24 to dispose the coulter discs 30 adjacent the leading edge of trash boards 28 and in alignment with the furrow forming edge 45 of the succeeding moldboards 26. Coulters 30 slice the soil and may cut bent over corn stalks 11 and thus reduce the size of the crop residue.

It will be appreciated that our invention utilizes the prior years crop residue for moisture conservation on poorly drained, heavy but erodible soils by transferring the stalks to the furrows as mulch material to retard evaporation of moisture from the furrows and thus facilitate retention of moisture. Also our invention reduces the amount of water required to grow a crop by directing rain or irrigation water into the furrows so it is forced down into the plant root zone and placing the stalk residue in the furrow as mulching when it is so decomposed to build up soil nutrients. In comparison so the method disclosed in U.S. Pat. No. 3,913,502, our disclosed method and apparatus: (a) eliminates the expensive shredder disclosed by this patent as well as the power required to operate the shredder; (b) removes plant roots which cannot be removed by the hilling discs taught by this patent; (c) forms residue-free new ridges rather than hilling existing ridges containing plants roots; and (d) provides more stable tracking than the method disclosed in this patent.

Although the preferred embodiment discloses two-row apparatus it will be appreciated that the invention is not so limited and that a greater number of moldboards 26 and trash boards 28 can be supported from plow frame 24 so that trash boards 28 are in front of each moldboard 26 to collect crop residue from the area in front of the moldboards 26 and the new ridge 18 being formed and transport the residue to the furrow 16 cut by the preceding moldboard 26.

Although the preferred embodiment has been described as providing an attractive method for preparing a field of heavy, poorly drained, erodible soil, our invention is not so limited and also provides substantial advantages in other types of soil.

The embodiments of the invention in which an exclusive property or privilege is claimed are defined as follows:

1. Apparatus for preparing a field having rows of crop residue for subsequent row crop planting comprising:
   a diagonal horizontal plow frame;
   a plurality of furrow cutting and ridge forming moldboards affixed to said plow frame and spaced apart a distance approximately equal to the spacing between said crop rows so as to cut furrows between crop rows and turn the soil lifted form the furrows onto surfaces not worked by said moldboards, thereby leaving unfilled the furrows created by the moldboards; and
   a plurality of trash boards affixed to said plow frame in alternating relation to said moldboards and spaced apart a distance approximately equal to the spacing between said crop rows and adapted to transport the unplowed crop residue into said furrows cut by said moldboards.

2. Apparatus in accordance with claim 1 wherein said moldboards are curved so as to lift and turn over the soil cut from said furrows into residue-free ridges on the scraped surfaces cleared by said trash boards.

3. Apparatus in accordance with claim 1 or 2 wherein said trash boards are disposed diagonally to the crop rows and adapted to scrape over the unplowed crop residue into the furrows cut by said moldboards and form scraped surfaces onto which said moldboards lift and turn over the soil from said furrows to form residue-free ridges.

4. Apparatus in accordance with claim 3 wherein said trash boards have lower scraper edges adapted to remove the crop residue.

5. Apparatus in accordance with claim 4 and including a plurality of soil slicing coulter discs affixed to said plow frame adjacent the leading edge of said trash boards and in alignment with the furrow cutting edges of said moldboards.

6. Tillage apparatus for preparing a field having rows of crop residue for subsequent row crop planting comprising:
   a horizontal plow frame disposed diagonally to said rows;
   a plurality of furrow cutting and ridge forming moldboards affixed in spaced apart relation to said plow frame so as to cut furrows between crop rows and being curved to lift and turn over the soil from said furrows onto surfaces not worked by any of said moldboards, thereby leaving unfilled the furrows created by the moldboards; and
   a plurality of elongated trash boards affixed to said plow frame diagonally to said rows and in alternate relation to said moldboards and being curved to scrape over the unplowed crop residue into said furrows being simultaneously cut by said moldboards;
   said moldboards turning over the soil lifted from the furrows onto the scraped surfaces being simultaneously cleared by said trash boards.

7. Ridge mulch tillage apparatus adapted to be moved across a field having rows of crop residue in a direction of travel parallel to said rows to prepare the field for planting, comprising:
   a horizontal plow frame disposed diagonally to said direction of travel;
   a plurality of trash boards affixed to said plow frame so as to be spaced apart, in a direction transverse to said direction of travel, a distance approximately equal to the spacing between adjacent crop rows and each being adapted to remove the unplowed crop residue in one of said rows; and
   a plurality of furrow cutting and ridge forming moldboards affixed to said plow frame in alternate relation to said trash boards and being spaced apart, in a direction transverse to said direction of travel, a distance approximately equal to the spacing between adjacent crop rows so as to cut furrows between said crop residue rows and being curved so as to lift and turn over the soil from said furrows onto, and form residue-free ridges on, surfaces not worked by any of said moldboards but which were cleared by said trash boards;
   said trash boards being disposed at a diagonal to said direction of travel and being adapted to transport the unplowed crop residue into said furrows cut by said moldboards.

8. Apparatus in accordance with claim 1, 2, 6 or 7 wherein said moldboards are narrower in a direction perpendicular to said crop rows than said spacing between crop rows.

9. Apparatus in accordance with claim 8 wherein a trash board precedes each said moldboard.

10. Apparatus in accordance with claim 8 wherein said trash boards are of a width in a direction perpendicular to said crop rows approximately equal to said spacing between said crop rows.

11. Apparatus in accordance with claim 10 wherein one edge of each said trash board is approximately in alignment with the edge of the succeeding moldboard.

12. Ridge mulch tillage apparatus adapted to be moved across a field having rows of crop residue in a direction parallel to said rows to prepare the field for planting comprising in combination:
   a horizontal plow frame disposed diagonally to said direction of travel,
   a plurality of furrow cutting and ridge forming moldboards each having a width in the direction perpendicular to said rows narrower than the spacing between crop rows and being affixed to said plow frame and spaced apart a distance approximately equal to the spacing between said crop rows so as to cut furrows between crop rows and turn the soil lifted from the furrows onto surfaces not worked by any of said moldboards, thereby leaving unfilled the furrows created by the moldboards, and
   a plurality of elongated trash boards having a width in a direction perpendicular to said crop rows approximately equal to said spacing between crop rows and being affixed to said plow frame diagonally to said rows and in alternate relation to said moldboards so that one edge thereof is approximately in alignment with the furrow cutting edge of the succeeding moldboard and being curved to scrape over the unplowed crop residue into said furrows cut by said moldboards,
   said moldboards being curved to lift and turn over the soil from said furrows onto, and form residue-free ridges on said surfaces not worked said by said moldboards and which are scraped by said trash boards.

13. Ridge mulch tillage apparatus in accordance with claim 6, 7 or 12 and including a plurality of crop residue cutting and soil slicing coulter discs each of which is affixed to said plow frame adjacent the leading edge of one of said scraper blades and in alignment with the furrow forming edge of the succeeding moldboard.

* * * * *